United States Patent [19]

Cordia et al.

[11] Patent Number: 5,403,993
[45] Date of Patent: Apr. 4, 1995

[54] ELECTRICAL HEATING TAPE

[75] Inventors: Johannes M. Cordia, Pellenberg, Belgium; Bruce Rogers, Grand Prairie, Tex.

[73] Assignee: N.V. Raychem S.A., Kessel-Lo, Belgium

[21] Appl. No.: 30,321
[22] PCT Filed: Sep. 17, 1991
[86] PCT No.: PCT/GB91/01587
§ 371 Date: Mar. 18, 1993
§ 102(e) Date: Mar. 18, 1993
[87] PCT Pub. No.: WO92/05674
PCT Pub. Date: Apr. 2, 1992

[30] Foreign Application Priority Data

Sep. 19, 1990 [GB] United Kingdom ............... 9020400

[51] Int. Cl.⁶ .................... H05B 3/34; B29C 65/34
[52] U.S. Cl. .................... 219/549; 219/543; 338/212
[58] Field of Search ............ 219/549, 528, 535, 543, 219/544, 548, 552, 553; 338/212; 392/432, 433, 434, 435, 438

[56] References Cited

U.S. PATENT DOCUMENTS

| | | | |
|---|---|---|---|
| 1,318,028 | 10/1919 | Thomson | 219/553 |
| 2,273,941 | 2/1942 | Dorn | 338/212 |
| 4,307,290 | 12/1981 | Bloore et al. | 219/528 |
| 4,352,083 | 9/1982 | Middleman et al. | 219/548 |
| 4,485,297 | 11/1984 | Grise et al. | 219/528 |
| 4,542,285 | 9/1985 | Grise | 219/543 |
| 4,645,912 | 2/1987 | Ando et al. | 219/541 |
| 4,661,689 | 4/1987 | Harrison | 219/528 |
| 4,761,541 | 8/1988 | Batliwalla et al. | 219/528 |
| 4,885,457 | 12/1989 | Au | 219/548 |
| 4,889,975 | 12/1989 | Farkas | 219/548 |
| 4,892,998 | 1/1990 | Marstiller et al. | 219/548 |
| 4,912,306 | 3/1990 | Grise et al. | 219/549 |
| 4,955,129 | 9/1990 | McCauley et al. | 219/549 |
| 5,019,797 | 5/1991 | Marstiller et al. | 219/548 |
| 5,286,952 | 2/1994 | McMills et al. | 219/549 |

FOREIGN PATENT DOCUMENTS

| | | |
|---|---|---|
| 0157640 | 10/1985 | European Pat. Off. |
| 0251482 | 1/1988 | European Pat. Off. |
| 2299782 | 8/1976 | France. |
| 1737584 | 1/1957 | Germany. |
| 1507851 | 4/1978 | United Kingdom. |
| 2024579 | 1/1980 | United Kingdom. |
| 2065430 | 6/1981 | United Kingdom ............... 219/535 |
| 2024577 | 12/1982 | United Kingdom. |
| WO88/06517 | 9/1988 | WIPO. |
| WO88/06577 | 9/1988 | WIPO. |
| WO89/05230 | 6/1989 | WIPO. |
| WO89/06480 | 7/1989 | WIPO. |
| WO89/12545 | 12/1989 | WIPO. |

OTHER PUBLICATIONS

British Search Report, Application No. 9020400.9, Oct. 11, 1990.
International Search Report, PCT/GB91/01587, Jan. 16, 1992.

Primary Examiner—Geoffrey S. Evans
Attorney, Agent, or Firm—Marguerite E. Gerstner; Herbert G. Burkard

[57] ABSTRACT

A conductive polymeric tape has elongate electrodes, (6) extending along its long edges, and comprises a central longitudinal strip (8) of different resistance to the remainder of the tape. The strip (8) extends part way only along the tape. The tape may also, or instead, contain discontinuities (20) preferably extending across the tape. The purpose of the strip (8) and the discontinuities (20) is to control the passage of electrical current and also the heat output of different parts of the tape.

12 Claims, 4 Drawing Sheets

ELECTRICAL HEATING TAPE

BACKGROUND OF THE INVENTION

FIELD OF THE INVENTION

This invention relates to an article comprising a conductive material, preferably a conductive polymeric material, which may be used, for example, for modifying, e.g. joining or repairing one or more substrates. In particular the invention relates to such articles, preferably in the shape of tapes, in which the flow of electrical current, and also the heat output of various parts of the article are specifically controlled.

INTRODUCTION TO THE INVENTION

Conductive polymers are well known. They comprise a polymeric component and, dispersed or otherwise distributed therein, a particulate conductive filler, e.g. carbon black. Conductive polymers have been widely used as electrical heaters. The heaters may be in the form of heat-recoverable articles per se or may be in the form of heat-recoverable articles so that, by powering the heater, the articles can be caused to recover, for example to join, to repair, or to reinforce one or more substrates around or against which the article recovers. Recently, it has been shown that conductive polymers which retain substantial strength above their melting point, especially sintered polymers such as ultra high molecular weight polyethylene (UHMWPE), are particularly useful for modifying plastic pipes, and EP-A-0157640 (MP0922 EPC) describes a heat recoverable coupler comprising carbon black containing UHMWPE. Also WO88/06517 and WO89/05230 (MP1180COM PCT1 and 2) describe conductive polymeric heaters in the form of tapes preferably made from UHMWPE. These tapes may be heat stable and can be arranged in a number of configurations for a number of applications. For example, as exemplified by FIG. 8 of WO80/06517, the conductive tape may be placed over a butt joint between two pipes and an elastomeric band used to press the tape against the joint. As the tape heats, with the elastomeric band pressing it against the pipes, it fuses to the pipes and joins them.

The tapes described in WO88/06577 and WO89/05230 typically comprise a conductive polymeric strip with two electrodes extending along the long edges of the tape so that current flows across the strip.

SUMMARY OF THE INVENTION

We have found that for some applications it is desirable for there to be non-uniform current flow, and hence non-uniform heating of such a tape. Thus, for example, where a conductive polymeric tape is wrapped around a butt joint it is desirable to prevent overheating in the butt area This may be caused by the presence of a gap, which may be up to I cm, between the two pipe ends to be joined. We have found that overheating can be avoided by reducing the resistance of the part of the tape overlapping the butt area.

Thus, the present invention provides an article comprising:

i) a conductive element in the form of a tape comprising a first part having a different electrical resistance from that of another part of the tape; and
ii) at least two elongate electrodes extending along the tape, and in electrical contact with the conductive element, which can be connected to a source of power to cause electrical current to flow across the tape;

wherein the said first part of the conductive tape is in the shape of a strip extending part way only along the length of the tape, between the electrodes, and separated from the electrodes by conductive material of different electrical resistance.

The different resistance values may be achieved, for example, by using materials of different resistivity, or by varying the thickness, or both. Where materials of different resistivity are used, these may be, for example, conductive polymeric materials of different resistivity, or completely different materials, e.g. a coating of a metal, e.g a metal spray, such as a flame sprayed metal, or an additional conductive braid. Where the thickness is varied, this may be done, for example by adding additional layers in certain regions.

Preferably the part of lower resistance is in the shape of the strip extending part way along the length of the tape between the electrodes, and separated from the electrodes by conductive material of higher resistance. Thus the lower resistance central strip is heated to a lesser amount than the higher resistance borders. However, where the conductive tape is wrapped around a butt joint to join elongate substrates the free (outer) end of the tape must bond to the underlying wrapped layer of tape. Thus it is desirable that the lower resistance strip of the tape does not extend completely to the end of the tape. Thus preferably the strip of lower resistance material extends only part way along the length of the conductive tape.

In one design, the article according to the invention additionally comprises a non-conductive substrate on which the conductive polymeric material and the electrodes are mounted. In a preferred embodiment of the invention the electrodes extend, uninterrupted, along at least a first length of the non-conductive substrate. The conductive polymeric element, however, extends along the said first length of the non-conductive substrate but contains an electrical discontinuity. The discontinuity is preferably in the form of a slit extending in a direction across the conductive element, that is preferably substantially perpendicular to the electrodes The discontinuity means that there is no electrical current flow across the discontinuity. Thus the discontinuity can control the direction of current flow in the conductive polymeric element.

Let us consider, for example, the specific tape construction described above, having a strip of lower resistance conductive material extending along part only of the length of the conductive tape. With that construction, because conductive material of higher resistance, and the electrodes, extend beyond the region of lower resistance towards the end of the tape, there is preferential current flow from the portion of the electrodes at the end of the tape through the region of the lower resistance conductive material. This causes a hot zone where the electrical current flow is concentrated, and a cool zone in the region from which the electrical current flow is diverted. This construction may be advantageous for certain applications, but is disadvantageous, for example, for a tape to be used wrapped around a butt joint between two plastic pipes. The inclusion of an electrical discontinuity, e.g. a slit, extending across the tape at the end of the region of conductive material of lower resistance, prevents distortion of the current flow, and hence avoids the hot and cold spots.

Thus, the use of the electrical discontinuities can be used to prevent preferential current paths through regions of lower resistance, or to prevent straying of electrical current generally, even in articles with no lower resistance region. Thus the use of electrical discontinuities in a conductive element per se is novel, and forms part of the present invention.

Thus, another aspect of the invention provides an article comprising i) a non-conductive substrate.
ii) a conductive element mounted on the non-conductive substrate, and containing at least one electrical discontinuity extending at least part way across the element; and
iii) at least two elongate electrodes mounted on and extending along the non-conductive substrate in electrical contact with the conductive element.

DETAILED DESCRIPTION OF THE INVENTION

Preferably the non-conductive substrate and the conductive element are in the form of a tape, and the at least one electrical discontinuity, which is preferably in the form of a slit, extends across the tape.

Preferably the conductive element comprises a conductive polymeric element.

The use of lower resistance areas, and/or the use of electrical discontinuities can also be used to tailor deliberately hotter or colder zones in a conductive element.

One or a number of electrical discontinuities may be used to control current flow. For example multiple parallel slits may extend across the conductive element, preferably a tape, to minimize current straying.

The or each electrical discontinuity may extend the whole or part way across the element. Where the element comprises a tape, the discontinuity preferably extends perpendicular to the tape length but may extend at an angle to the tape. Similarly, where the element is another shape, comprising substantially parallel electrodes, the discontinuity preferably extends substantially perpendicular to the electrodes, but may extend at an angle to the electrodes.

Where an electrical discontinuity is present, particularly where it extends the whole way across the conductive element between the electrodes, it effectively produces two distinct heating zones, powered by the electrodes. If the distance between the electrodes in each zone is the same, but only one zone contains a, so-called "cold zone", i.e. a region of lower resistance, where less heat is generated, then this means that the watt density in the two zones is different. This means that the higher resistance zone (i.e. the one without a cold zone) takes longer to activate to a desired temperature (e.g. to weld to itself) than the other lower resistance zone. This means that the other zone is heated longer than required, which may overheat and damage it. Therefore in a preferred embodiment a region or regions of lower resistance are included in both distinct heating zones, thereby balancing the heat output of the two zones. These additional low resistance regions are positioned where they will not affect the desired heating or bonding characteristics. For example in the case of a tape with a strip of low resistance conductive material extending only part way along the length of the conductive tape, and a discontinuity in the form of a slit extending across the tape towards the end of the low resistance strip, then preferably two strips of lower resistance conductive material extend along the remaining length of the tape, on the other side of the discontinuity Preferably they are positioned adjacent the electrodes so that the main body of the end region is heated. Preferably the total width of the two additional low resistance strips is the same as the width of the single central strip on the first side of the discontinuity. This means that the heat output in the two distinct heating zones, on either side of the discontinuity is balanced.

As stated above the conductive element may comprise a number of materials. In one embodiment, the conductive element preferably comprises a conductive polymeric material. In this case, it preferably comprises polyethylene, particularly ultrahigh molecular weight polyethylene (UHMWPE) together with a particulate conductive filler, especially carbon black. In general, the composition preferably consists essentially of (a) a matrix consisting essentially of organic polymer particles which have been sintered together so that the particles have coalesced without completely losing their identity, and
(b) a particulate filler, preferably carbon black, which is dispersed in said matrix but which is present substantially only at or near the boundaries of the coalesced particles.

Suitable formulations are found in European applications 157,640 and 720,117, the disclosures of which are incorporated herein by reference. Although UHMWPE is preferred, other polymers that may be sintered include polytetrafluoroethylene, polyphenylene sulphide, and polyimides.

The conductive polymers particularly suitable for use in particular embodiments of this invention generally have a low electrical resistivity, generally below 1000 ohm-cm, particularly below 100 ohm-cm, especially below 10 ohm-cm, for example, in the range of about 0.5 to 10 ohm-cm. If the conductive polymer is to be electrically powered, the desired resistivity depends upon the power source, which may be for example DC up to about 48 volts or AC of up to about 120 or 240 volts. Sintering produces low electrical resistivity at a lower conductive filler loading than for a melt-blended product. Thus the preferred sintered compositions for use in this invention contain less than 9%, preferably less than 7%, particularly 2–6%, by volume of carbon black or other conductive filler. Particularly preferred carbon blacks are those sold by Akzo Chemie under the tradename "KETJEN BLACK" EC and by Degussa under the tradename "PRINTEX" XE-2. The low levels of carbon black help to maintain the desired physical properties of the polymer such as flexibility, good elongation, high tensile strength, good notch and impact resistance, and good chemical resistance. The conductive polymer may optionally be cross-linked.

The preferred polymers are those which maintain a relatively high viscosity above their softening or melting point; i.e. those polymers which, at a temperature 50° C. above their softening point, have a melt flow index of less that 0.3 g/10 min., particularly less than 0.1 g/10 min., especially less than 0.05 g/10 min at a loading of 3 kg, and a melt flow index less than 3.0 g/10 min., particularly less than 1.0 g/10 min., especially less than 0.1 g/10 min. at a loading of 15 kg. UHMWPE, which has a molecular weight preferably greater than 1.5 million, particularly greater than 3.0 million, and frequently as high as 4 to about 6million, is a most preferred polymer in this invention, although very high molecular weight polyethylene (VHMWPE), which has a molecular weight of about 150,000 or 600,000 to 1.5 million may also be used after melt-blending.

The conductive polymers useful in the present invention preferably exhibit ZTC properties; i.e., in the temperature range of operation, e.g. 23°–250° C., the resistivity changes by a factor of less than 5, preferably less then 2, especially less than 1.

The conductive polymeric materials having the above quoted preferred resistivity values are particularly suitable for use as couplings for polymeric pipes.

The thickness of the article, e.g. the tape, may be substantially uniform or, e.g. at its thickest point, may be 1.5 to 3 times, its thickness at its thinnest point.

For adequate bonding to an article, when electrically powered or otherwise heated, the conductive polymer preferably can achieve a bond-line temperature of a least 135° C., preferably 150° C., more preferably at least 200° C., especially at least 250° C. The desired temperature is preferably attained under normal ambient conditions in less than 30 minutes, preferably less than 15 minutes, particularly less than 5 minutes, especially 0.5 to 3 minutes. Such rapid heating and high temperatures can result in short installation times and minimal damage to the conductive polymer, the substrates or surrounding material.

The article according to the invention may be used for joining substrates. In one preferred embodiment the article is used as an internal gasket on the inner surfaces of and/or between overlapping component parts of a tubular or wraparound coupler, as described for example in PCT publication No. WO89/12545 (MP1180 PCT3).

Thus in one embodiment the article of the invention comprises a gasket in a coupler which comprises
(1) one or more tube-forming components which are not heat-recoverable and which are composed of an electrically insulating polymeric composition; and
(2) one or more gaskets secured to the inner surface(s) of the tube-forming component(s) and comprising
    (a) at least one laminar heating element which is composed of a conductive polymer, and
    (b) at least two electrodes which can be connected to a source of electrical power and which, when so connected, cause current to pass through the heating element(s) substantially parallel to the surface thereof, said tube-forming component(s) and gasket(s) being such that they can be assembled and/or deformed into a tubular coupler which, when around or in a pipe, can be brought into intimate contact with the, pipe by circumferential forces applied to the coupler.

In another embodiment, the article of the invention comprises a coupler which comprises
(1) at least one first member which
    (a) is not heat-recoverable,
    (b) is composed of an electrically insulating polymeric composition,
    (c) has chamfered edges, and
    (d) comprises one or more gaskets secured to the inner surface of the first member and comprising
        (i) at least one first laminar heating element which is composed of a conductive polymer, and
        (ii) at least two electrodes which can be connected to a source of electrical power and which, when so connected, cause current to pass through the first heating element substantially parallel to the surface thereof; and
(2) at least one second member which
    (a) is not heat-recoverable,
    (b) is composed of an electrically insulating polymeric composition,
    (c) has chamfered edges, and
    (d) comprises one or more gaskets secured to the inner surface and the chamfered edges of the second member and comprising
        (i) at least one second laminar heating element which is composed of a conductive polymer; and
        (ii) at least two electrodes which can be connected to a source of electrical power and which, when so connected, cause current to pass through the second heating element substantially parallel to the surface thereof;

said first and second members being such that they can be assembled into a tubular coupler wherein (1) the chamfered edges of the first and second members can slide relative to each other to reduce the diameter of the coupler and (2) the second heating element extends beyond the outer surface of the first and second members and, when connected to a source of electrical power, causes the first and second members to be secured to one another.

Where the article is used in applications where the ends of the article, e.g. tape, are overlapping there may be overheating in the overlap ares. For example where the tape is used as a lining in a coupler with tapered overlapped ends as described in WO89/12545 (MP1180 PCT3) the underlap area may overheat at its tip. Such overheating in this or other applications may be avoided by removed controlled sections of the article to lower the watt density in that region. For example, for an article in the form of a tape, strips of conductive material extending part way along the tape may be removed.

Where it is desirable gradually to change the watt density in various parts of the article this may be achieved by either adding material (i.e. thicker conductive parts) or by removing conductive material. Where removal of material is used, the geometry of the part removed can be selected to achieve the desired gradation of watt density. For example slits with ends tapering to a point at either end can be used.

As well as for joining, articles according to the invention can be used for environmental protection. For example, protection of cables and pipes may be achieved by the wrapping of a sheet of material around a substrate, i.e. by the use of a "wrap-around" sleeve, and forming an effective low profile seal between the edges of the wrap-around sleeve by use of a conductive polymer sealing strip according to the invention. The conductive polymer, when heated, may have a significant coefficient of thermal expansion and the sealing device, when heated, may serve to locate the two surfaces to be joined, optionally bridging a gap between them.

Embodiments of the present invention will now be described, by way of example, with reference to the accompanying drawings herein.

DETAILED DESCRIPTION OF THE DRAWING

Figure 1:
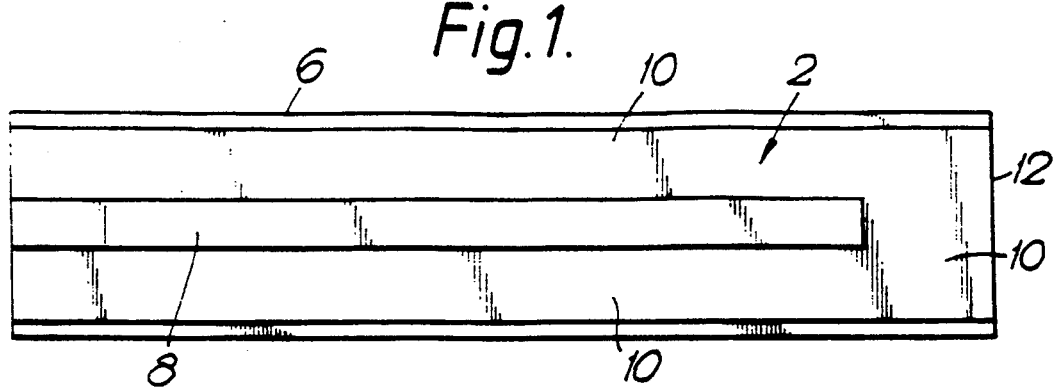
FIG. 1 is a plan view showing an article according to the present invention.
Figure 2:
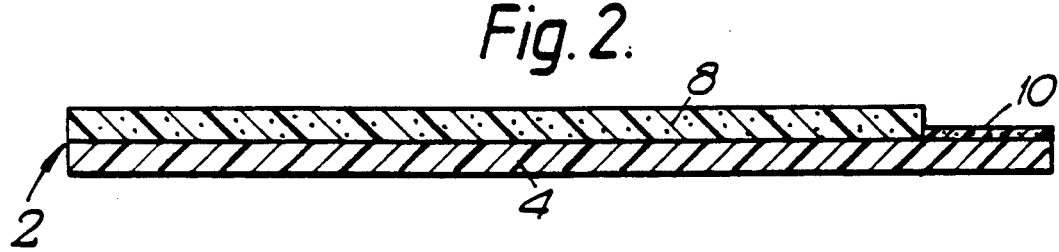
FIG. 2 is a cross-sectional longitudinal view through the center of the article of FIG. 1.

Referring now to the drawings, FIGS. 1 and 2 show a conductive polymeric tape 2 mounted on a non-conductive substrate 4. Two elongate electrodes 6 extend along the long edges of the tape and can be connected to a source of electrical power to cause electrical current to flow across the width of the tape. A central strip 8 of lower resistance extends part way along the length of the tape 2. This is bounded by conductive regions of higher resistance 10 on either side of the lower resistance strip 8, and at one end 12 of the strip. The lower resistance strip 8 and the higher resistance regions 10 comprise the same conductive material, but the material is thicker in the region 8 than in the regions 10 to provide the difference in resistance. This increased thickness is preferably achieved by adding one or more additional layers of material in the region 8. For simplicity, the layers are not shown separately in the Figure. When the electrodes are connected to a source of electrical power less heat is generated through the strip of the lower resistance material than in the remainder of the conductive material.

Figure 3:
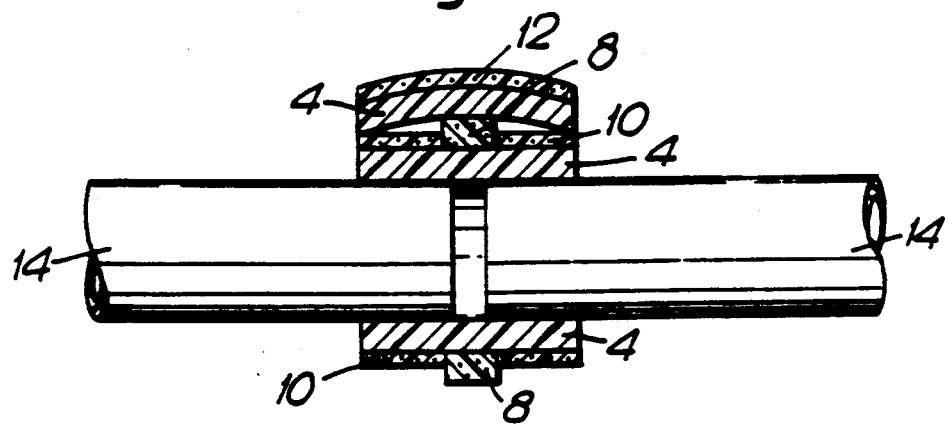
FIG. 3 is a longitudinal section view of the tape of FIGS. 1 and 2 wrapped to form a butt joint between two pipes.

FIG. 3 shows the tape of FIGS. 1 and 2 wrapped around to form a butt joint between two plastic pipes 14. The strip of lower resistance material 8 lies adjacent the butt region where otherwise them could be overheating. The end of the tape 12 does not include a low resistance portion, so it is well heated and can bond to the underlying wrapped tape to complete the joint.

Figure 4:
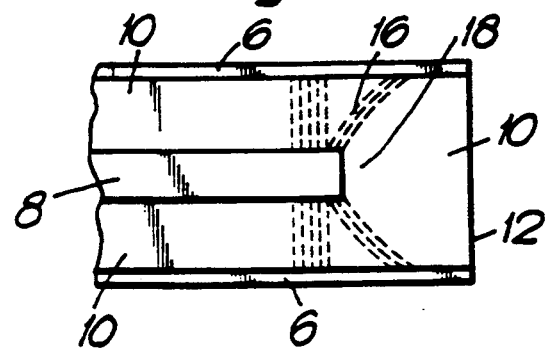
FIG. 4 is a schematic plan view showing the lines of preferred electrical current flow at the end of the article of FIG. 1.

FIG. 4 shows the lines of preferential electrical current flow at the ends of the tape of FIGS. 1 and 2. At the end 12 of the strip, instead of taking the shortest electrical path (i.e. directly across the strip), the electrical current preferably follows the path of lowest resistance, and therefore is diverted to the end of the central strip 8 of lower resistance This results in a hot zone 16 and cold zone 18 at the end of the lower resistance strip 8.

Figure 5:
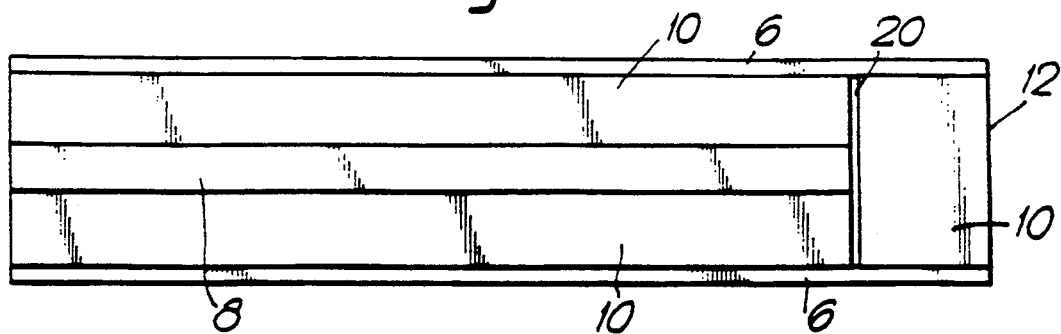
FIGS. 5 and 6 are plan and side views respectively showing another article according to the invention.
Figure 6:
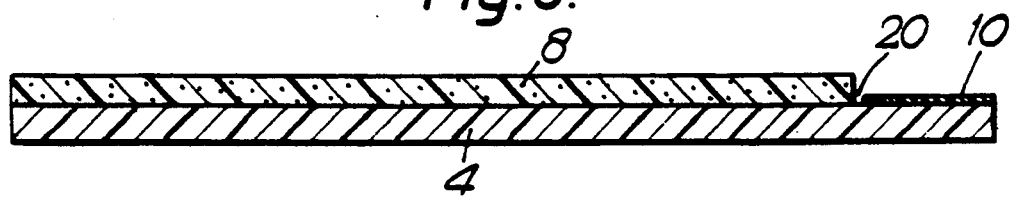

FIGS. 5 and 6 are plan and longitudinal sectional views through another article according to the invention. The article is similar to the article of FIGS. 1 and 2 but includes a slit 20, extending across the strip at the end of the lower resistance region 8. This represents an electrical discontinuity. Therefore electrical current flowing between the electrodes at the end 12 of the strip is not diverted as was shown with reference to FIG. 4 for the article of FIGS. 1 and 2, but flows directly across the strip, substantially perpendicular to the length of the strip.

Figure 7:
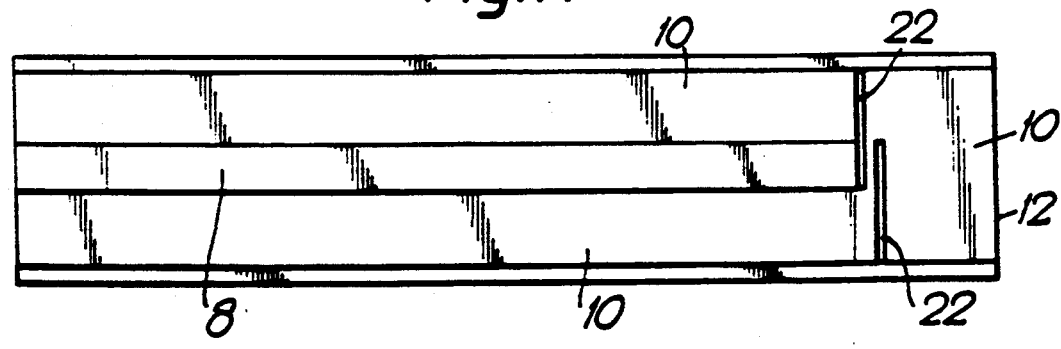
FIGS. 7 and 8 are plan and side views respectively showing another article according to the invention.
Figure 8:
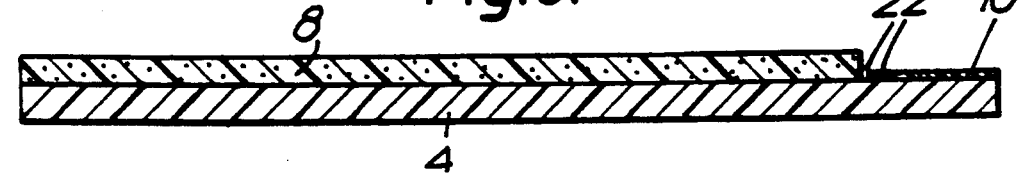

FIGS. 7 and 8 are plan and longitudinal sections through another article according to the invention. The article is similar to that of FIGS. 5 and 6 but includes two transverse slits 22, which each extend only part way across the strip.

Figure 9:
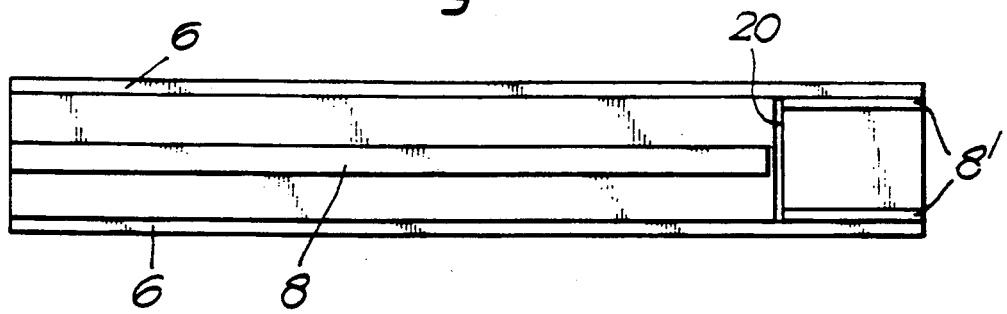
FIGS. 9 is a plan view of a modification of the article of FIGS. 5 and 6.

FIG. 9 illustrates a modification to the embodiment of FIGS. 5 and 6. In this case, two strips 8' of low resistance extend adjacent each electrode 6 respectively, on the opposite side of the slit 20 from the first central strip 8 of lower resistance. The total width of strips 8' is approximately the same as that of strip 8. The purpose of the additional strips 8' is to balance the heat output on either side of slit 20. The lower resistance strips 8' may be formed in the same way as strip 8.

Figure 10:
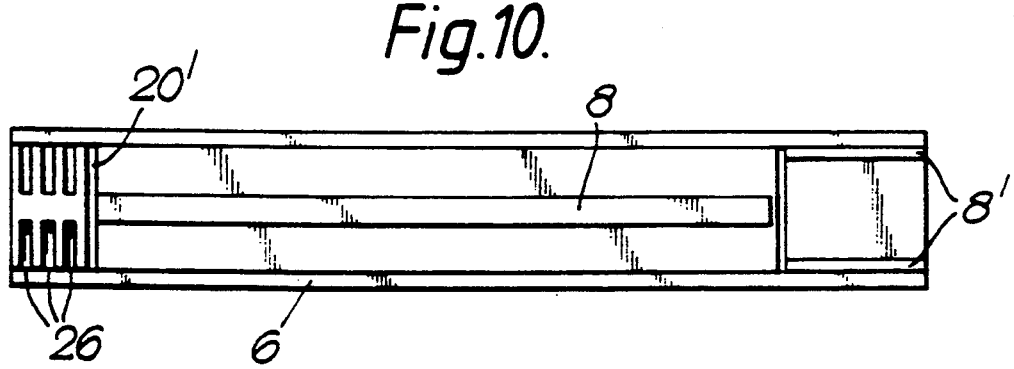
FIG. 10 is a plan view of a modification of the article of FIG. 9.

FIG. 10 illustrates a further modification to the whole of FIG. 9. In this case a second slit 20' is included towards the other end of the tape from the first slit 20, so that the tape is effectively split into three distinct heating zones. Conductive material has been removed in strips 26 extending part way across the tape in the new third zone. The purpose of this is to reduce the watt density in that zone. This may be desirable if that part of the tape is to be overlapped e.g. adjacent a thin part to be coupled.

Figure 11:
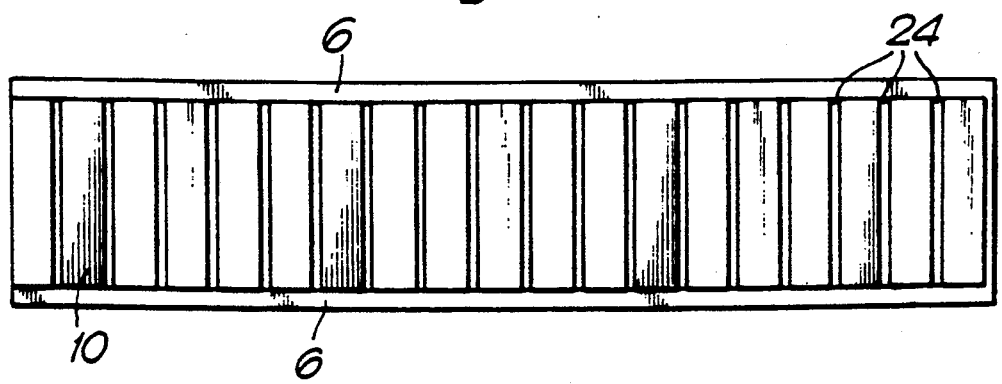
FIG. 11 is a plan view showing another article according to the invention.

FIG. 11 is a plan view through another article according to the invention including multiple slits 24, extending parallel to each other, across the width of the tape, to prevent straying of electrical current. This is useful even in the absence of a lower resistance area 8. The slits effectively define separate heating zones in the tape. The tape may be designed so adjacent zones have different resistances to give different heating effects. The slits prevent straying of current to the lower resistance areas in this case.

Figure 12:
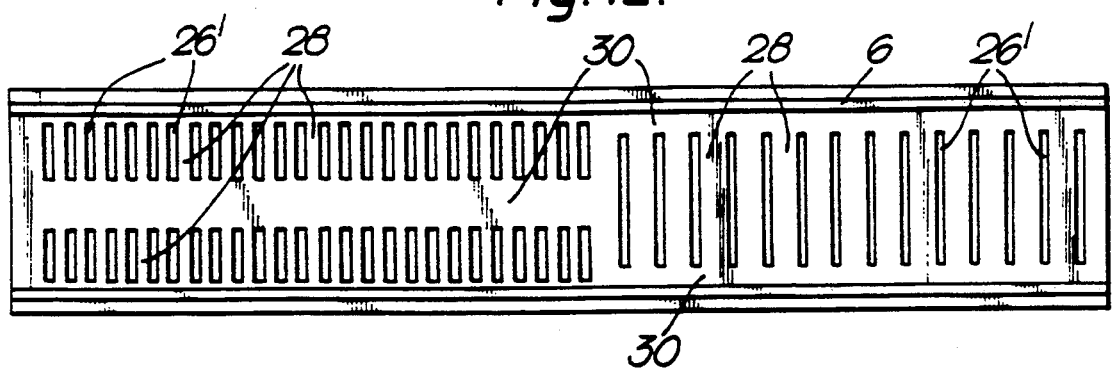
FIG. 12 is a plan view of another embodiment of the invention.

FIG. 12 is another embodiment according to the invention in which strips 26' of conductive material, extending across the tape have been removed. This alters the watt density and results in hotter zones 28 and cooler zones 30. This illustrates the way the removal of conductive material can be used (instead of, or in addition to, the addition of conductive material) to regulate the electrical current flow and watt density.

Figure 13:
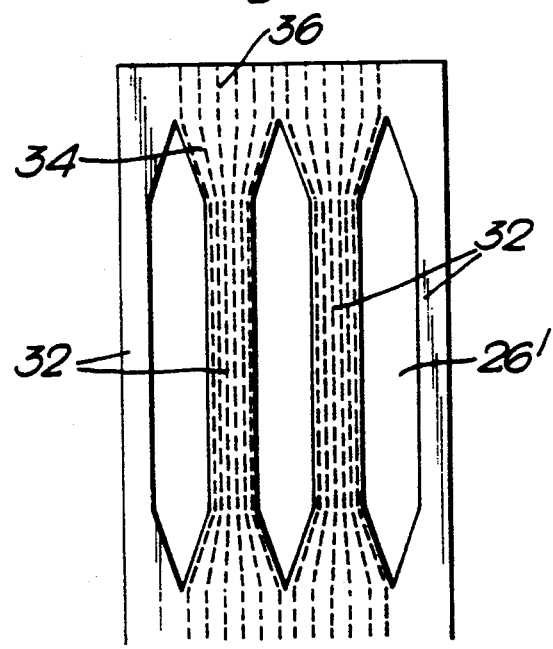
FIG. 13 is an enlarged view of part of the article of FIG. 12.

FIG. 13 is an enlarged view showing the removed portions 26' of conductive material and the surrounding region of the tape. The portions 26 are in the form of strips with ends tapered to a point. This results in regions of higher watt density 32, transitional watt density 34 and lower watt density 36.

It will be appreciated that the actual layout and shape of strips 26' is merely one example of the way the watt density can be changed. Given the general principle the man skilled in the art could adapt the design for other desired current density variations.

We claim:

1. An article comprising
   i) a non-conductive substrate,
   ii) a conductive element in the form of a tape mounted on the non-conductive substrate, and containing at least one electrical discontinuity which (a) extends at least part way across the element, and (b) is a slit in the element; and
   iii) at least two elongate electrodes mounted on and extending along the non-conductive substrate in electrical contact with the element.

2. An article according to claim 1 wherein the conductive element comprises a first part which
   i) is a region of conductive material having a lower electrical resistance from that of another part of the tape, and
   ii) is in the shape of a strip extending part way only along the length of the tape, between the electrodes, and separated from the electrodes by a region of conductive material of higher electrical resistance.

3. An article according to claim 2 wherein the slit extends across the tape at an end of the first part.

4. An article according to claim 1 wherein at least part of the element comprises conductive polymeric material.

5. An article according to claim 4 wherein the element comprises sintered ultra high molecular weight polyethylene.

6. An article according to claim 1 wherein the slit extends in a direction across the element substantially perpendicular to the electrodes.

7. An article according to claim 5 wherein the slit extends completely across the element.

8. An article according to claim 5 wherein there are two or more electrical discontinuities in the element.

9. A method of forming a butt joint between two elongate substrates comprising (A) wrapping an article around the substrates, said article comprising
   i) a non-conductive substrate,
   ii) a conductive element in the form of a tape which is mounted on the non-conductive substrate, and containing at least one electrical discontinuity which (a) extends at least part way across the element, and (b) is a slit in the element; and
   iii) at least two elongate electrodes mounted on and extending along the non-conductive substrate in electrical contact with the conductive element; and (B) powering the electrodes to pass electrical current through the conductive material to heat the conductive material.

10. A method according to claim 9 wherein the conductive element comprises a first part which
   i) is a conductive material having a lower electrical resistance from that of another part of the tape, and
   ii) is in the shape of a strip extending part way only along the length of the tape, between the electrodes, and separated from the electrodes by conductive material of higher electrical resistance.

11. A method according to claim 10 wherein the regions of different electrical resistance comprise the same material, but a lower resistance region is thicker than a higher resistance region.

12. A method according to claim 10 wherein the slit extends across the tape at an end of the first part.

* * * * *